United States Patent
Ramstetter et al.

(10) Patent No.: US 6,266,953 B1
(45) Date of Patent: Jul. 31, 2001

(54) METHOD OF OPERATING A GAS AND STEAM TURBINE PLANT

(75) Inventors: Asbjoern Ramstetter, Herzogenaurach (DE); Ralf Sigling, Alpharetta, GA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/655,289

(22) Filed: Sep. 5, 2000

Related U.S. Application Data

(63) Continuation of application No. PCT/DE99/00530, filed on Feb. 26, 1999.

(30) Foreign Application Priority Data

Mar. 2, 1998 (DE) .............................................. 198 08 722

(51) Int. Cl.[7] .............................. F02C 6/00; F22B 1/18; F22B 37/00; B01D 53/86
(52) U.S. Cl. .................. 60/39.02; 60/39.182; 60/39.463; 123/7 B
(58) Field of Search .............................. 60/39.02, 39.182, 60/39.5, 39.463; 122/7 R, 7 B; 423/237, 238

(56) References Cited

U.S. PATENT DOCUMENTS

| | | |
|---|---|---|
| 4,473,536 | 9/1984 | Carberg et al. . |
| 5,098,680 * | 3/1992 | Fellows et al. ...................... 423/235 |
| 5,282,355 * | 2/1994 | Yamaguchi ........................ 60/39.182 |
| 5,435,126 * | 7/1995 | Beaudoin .......................... 60/39.463 |
| 6,071,377 * | 6/2000 | Lindman ................................ 162/31 |

FOREIGN PATENT DOCUMENTS 2 082 084   3/1982   (GB) .

* cited by examiner

*Primary Examiner*—Ted Kim
(74) *Attorney, Agent, or Firm*—Herbert L. Lerner; Laurence A. Greenberg; Werner H. Stemer

(57) ABSTRACT

A method of operating a gas and steam turbine plant includes operating a gas turbine with a fuel to produce an expanded working medium and generating steam for a steam turbine from heat contained in the expanded working medium leaving the gas turbine. A reducing agent and a supply of an adjustable quantity of carrier air are introduced into the working medium with a metering system, for catalytically cleaning the working medium. The quantity of carrier air is adjusted as a function of the type of fuel supplied to the gas turbine. The quantity of carrier air is controlled only with a first air compressor for gas fuel operation of the gas turbine and additionally with a second air compressor, connected in parallel with the first air compressor, for oil fuel operation of the gas turbine. A gas and steam turbine plant is also provided.

2 Claims, 1 Drawing Sheet

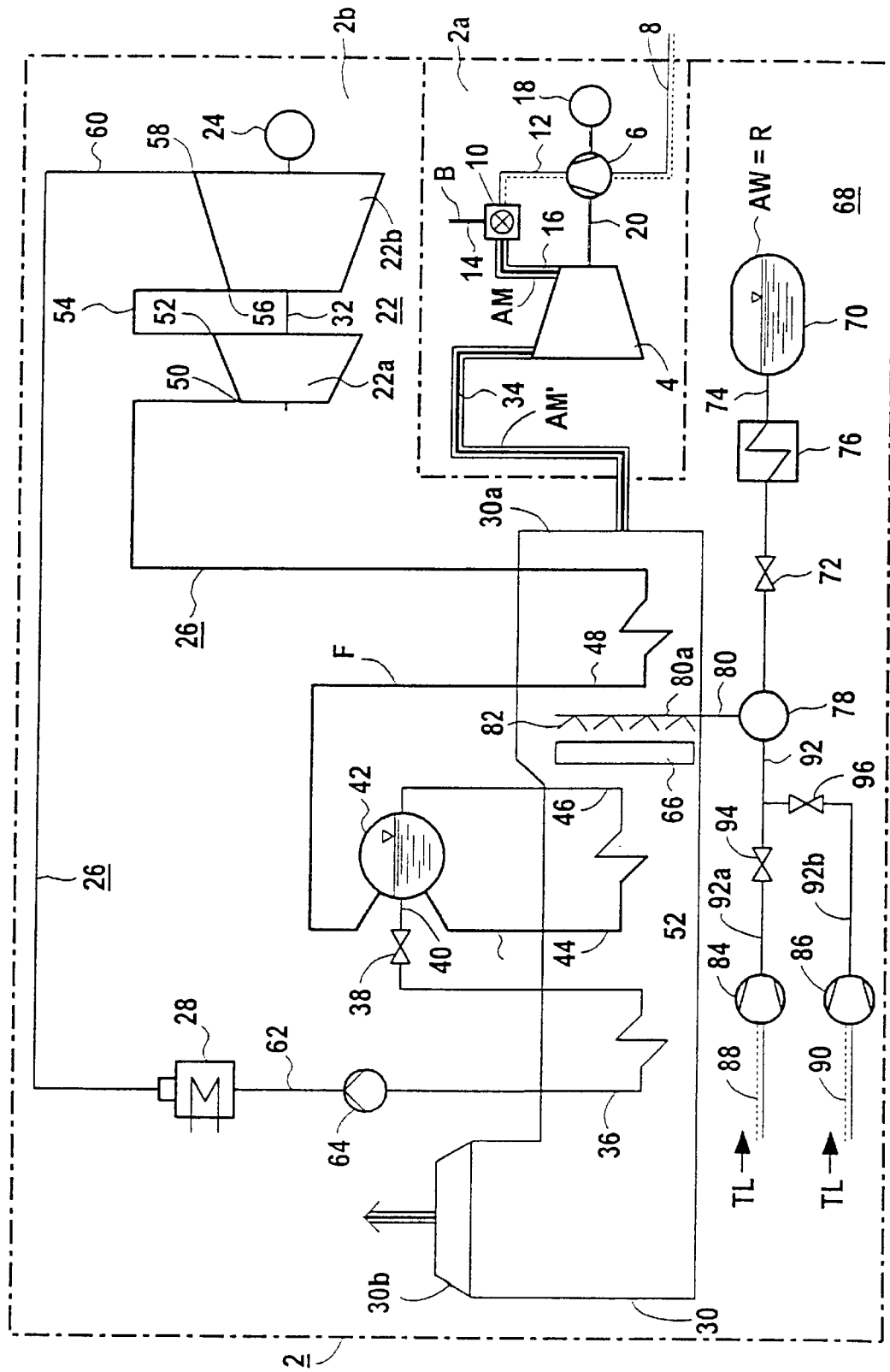

METHOD OF OPERATING A GAS AND STEAM TURBINE PLANT

CROSS-REFERENCE TO RELATED APPLICATION

This application is a continuation of copending International Application No. PCT/DE99/00530, filed Feb. 26, 1999, which designated the United States.

BACKGROUND OF THE INVENTION

Field of the Invention

The invention relates to a method of operating a gas and steam turbine plant, in which heat contained in an expanded working medium from a gas turbine, which is operated by a fuel, is used to generate a steam for a steam turbine, and a reducing agent is introduced by a metering system, with a supply of an adjustable quantity of carrier air, into the working medium, for the catalytic cleaning of the working medium. The invention also relates to a plant operating in accordance with the method.

In a gas and steam turbine plant, the heat contained in the expanded working medium from the gas turbine is used for generating steam for the steam turbine. The heat transfer takes place in a waste-heat steam generator which is installed downstream of the gas turbine and in which heating surfaces are disposed in the form of tubes or tube bundles. The heating surfaces are in turn connected into a water/steam circuit of the steam turbine. The water/steam circuit usually includes a plurality of pressure stages, for example two. Each pressure stage usually has a preheater heating surface (economizer), an evaporator heating surface and a superheater heating surface.

The selective catalytic reduction method, the so-called SCR method, can be employed to decrease the amount of oxides of nitrogen in the exhaust gases of the gas turbine. In the SCR method, oxides of nitrogen ($NO_x$) are reduced to nitrogen ($N_2$) and water ($H_2O$) with the aid of a reducing agent and a catalytic converter.

In a gas and steam turbine plant constructed for an SCR method, a catalytic converter is generally disposed in the waste-heat steam generator. The catalytic converter is used to initiate and/or maintain a reaction between the reducing agent introduced into the exhaust gas and the oxides of nitrogen.

As is known from U.S. Pat. No. 4,473,536, the reducing agent required for the method can be injected with air generated by an air compressor or fan, as a carrier flow, into the exhaust gas from the gas turbine, that is flowing through the waste-heat steam generator. It is possible to vary the quantity of reducing agent to be injected by controlling the quantity of air as a function of the exhaust gas mass flow from the gas turbine.

As a rule, however, the emission of oxides of nitrogen from the gas turbine is higher in the case of oil operation than in the case of gas operation. In order to keep within the legally specified limiting values, the quantity of reducing agent to be injected for the oil operation of the gas turbine is therefore greater than that for gas operation. However, because of an undesirable cooling of the exhaust gas caused by the injection of the air/reducing agent mixture, the efficiency of the gas and steam turbine plant in that configuration can be impaired to a different extent, depending on the operating condition.

SUMMARY OF THE INVENTION

It is accordingly an object of the invention to provide a method of operating a gas and steam turbine plant and such a plant, which overcome the hereinafore-mentioned disadvantages of the heretofore-known methods and devices of this general type and in which a particularly high efficiency is ensured, under all operating conditions of the gas turbine, with a particularly low level of technical complexity and without a complicated control system.

With the foregoing and other objects in view there is provided, in accordance with the invention, a method of operating a gas and steam turbine plant, which comprises providing a gas turbine and a steam turbine; operating the gas turbine with a fuel to produce an expanded working medium; generating steam for the steam turbine from heat contained in the expanded working medium leaving the gas turbine; introducing a reducing agent and a supply of an adjustable quantity of carrier air into the working medium with a metering system, for catalytically cleaning the working medium; adjusting the quantity of carrier air as a function of a type of the fuel supplied to the gas turbine; controlling the quantity of carrier air only with a first air compressor for gas operation of the gas turbine; and controlling the quantity of carrier air additionally with a second air compressor, connected in parallel with the first air compressor, for oil operation of the gas turbine.

In this configuration, the invention is based on the consideration that a particularly high efficiency of the gas and steam turbine plant is provided if the heat made available, by the exhaust gas of the gas turbine, for the waste-heat steam generator, can be utilized almost completely for the steam process. Therefore, the quantity of carrier air should be kept particularly small in the SCR method. It should therefore be possible for the carrier air quantity to be adapted to suit the quantity of reducing agent to be introduced as a function of the type of fuel for the gas turbine. Particularly simple control of the carrier air quantity can be achieved if the output of the air compressors can be adjusted as a function of the type of fuel supplied to the gas turbine.

In this configuration, a first air compressor is advantageously connected in parallel with a second air compressor. In this embodiment, the first and second air compressors can be operated both simultaneously and alternately. One air compressor can then be operated in the case of gas operation and both air compressors can be operated in the case of oil operation of the gas turbine. However, a precondition for this is an appropriate configuration of the air compressors. In this way, the carrier air quantity that is necessary can be adjusted particularly simply.

Each air compressor advantageously has a drive with a speed controlled relative to the output of the air. In this configuration, the control of the air output is possible through the use of the number of drives as well as through the use of the respective speed-controlled drives. The carrier air quantity to be injected can therefore, in addition, be particularly well adapted to the various types of fuel supplied to the gas turbine.

With the objects of the invention in view, there is also provided, a gas and steam turbine plant, comprising a gas turbine to be selectively operated both with gas and with oil as a fuel for producing an expanded working medium; a waste-heat steam generator disposed downstream of the gas turbine; a catalytic converter disposed in the steam generator for catalytically cleaning the expanded working medium from the gas turbine; and a metering system having first and second air compressors for introducing a reducing agent into the working medium, the second air compressor connected in parallel with the first air compressor at least during oil operation of the gas turbine.

The advantages achieved through the use of the invention reside, in particular, in ensuring an air supply for the metering system, which can be adjusted, with a particularly low level of technical complexity through the use of the air compressors. Since the air supply can be adjusted as a function of the type of fuel supplied to the gas turbine, the cooling (caused by the SCR process) of the exhaust gas flowing through the waste-heat steam generator is particularly small under all operating conditions of the gas turbine. A particularly high efficiency of the gas and steam turbine plant is therefore ensured under all operating conditions of the gas turbine plant.

Other features which are considered as characteristic for the invention are set forth in the appended claims.

Although the invention is illustrated and described herein as embodied in a method of operating a gas and steam turbine plant and such a plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic and schematic illustration of a gas and steam turbine plant according to the invention.

DESCRIPTION OF THE PREFERRED EMBODIMENTS

Referring now in detail to the single FIGURE of the drawing, there is seen a gas and steam turbine plant 2 which includes a gas turbine plant 2a and a steam turbine plant 2b. The gas turbine plant 2a includes a gas turbine 4 with a coupled air compressor 6. The air compressor 6 has an inlet side connected to an induction air conduit 8. A combustion chamber 10, which is connected to a fresh air conduit 12 of the air compressor 6, is connected upstream of the gas turbine 4. A fuel conduit 14 opens into the combustion chamber 10 of the gas turbine 4. Oil or gas can be supplied as fuel B to the gas turbine 4 through the use of the fuel conduit 14. A conduit 16 is provided for supplying working medium AM from the combustion chamber 10 to the gas turbine 4. The gas turbine 4 and the air compressor 6, together with a generator 18, are seated on a common shaft 20.

The steam turbine plant 2b includes a steam turbine 22 with a coupled generator 24, as well as a condenser 28 installed downstream of the steam turbine 22 and a horizontally disposed waste-heat steam generator 30. The condenser 28 and the waste-heat steam generator 30 are disposed in a water/steam circuit 26. The steam turbine 22 is formed of a first pressure stage or high-pressure part 22a and a second pressure stage or low-pressure part 22b, which drive the generator 24 through the use of a common shaft 32.

An exhaust gas conduit 34 is connected to an inlet 30a of the waste-heat steam generator 30 to supply working medium AM' or exhaust gas, expanded in the gas turbine 4, into the waste-heat steam generator 30. The exhaust gas from the gas turbine 4 leaves the waste-heat steam turbine 30 through an outlet 30b thereof in the direction of a non-illustrated chimney.

In a first pressure stage or high-pressure stage of the water/steam circuit 26, the waste-heat steam generator 30 includes a high-pressure preheater or economizer 36, which is connected to a high-pressure drum 42 through the use of a conduit 40 which can be shut off by a valve 38. In order to form a water/steam circuit 46, the high-pressure drum 42 is connected to a high-pressure evaporator 44 which is disposed in the waste-heat steam generator 30. The high-pressure drum 42 is connected to a high-pressure superheater 48 disposed in the waste-heat steam generator 30 for the removal of live steam F. This high-pressure superheater 48 has an outlet end connected to a steam inlet 50 of the high-pressure part 22a of the steam turbine 22.

A steam outlet 52 of the high-pressure part 22a of the steam turbine 22 is connected by a transfer conduit 54 to a steam inlet 56 of the low-pressure part 22b of the steam turbine 22. A steam outlet 58 of the low-pressure part 22b of the steam turbine 22 is connected by a steam conduit 60 to the condenser 28. The latter is connected by a feed-water conduit 62 to the economizer 36 so that a closed water/steam circuit 26 appears. A feed-water pump 64 is installed in the feed-water conduit 62.

Only the first pressure stage of the water/steam circuit 26 is shown in detail in the embodiment example illustrated in the figure. However, further non-illustrated heating surfaces can be disposed in the waste-heat steam generator 30 and these can be respectively associated with a medium-pressure stage or a low-pressure stage of the water/steam circuit 26. These heating surfaces are connected in an appropriate manner to the steam inlet 56 of the low-pressure part 22b of the steam turbine 22.

The gas and steam turbine plant 2 provides for the use of the selective catalytic reduction method, the so-called SCR method, for the catalytic cleaning of oxides of nitrogen ($NO_x$) from the exhaust gas of the gas turbine 4. In the SCR method, oxides of nitrogen ($NO_x$) are reduced to nitrogen ($N_2$) and water ($H_2O$) with the aid of a catalytic converter and a reducing agent R.

In order to carry out the SCR method, a catalytic converter 66, which is configured as a $DeNO_x$ catalytic converter, is disposed in the waste-heat steam generator 30 in a flow region for the exhaust gas between the high-pressure evaporator 44 and the high-pressure superheater 48. The steam turbine plant 2b has a metering system 68 for the introduction of ammonia solution AW (as the reducing agent R) into the waste-heat steam generator 30.

The metering system 68 includes a storage tank 70 for ammonia solution AW. Ammonia solution AW passes from this storage tank 70, through a conduit 74, which can be shut off by a valve 72 and in which an evaporator 76 is installed, into a mixing space 78 of the metering system 68. A mixing of air and ammonia solution AW, which has been evaporated in the evaporator 76, takes place in the mixing space 78. An inlet conduit 80, which opens into the waste-heat steam generator 30, is connected to the mixing space 78. The inlet conduit 80 is used for supplying the evaporated ammonia solution AW, which is mixed with carrier air TL, to the waste-heat steam generator 30. A number of nozzles 82 are connected onto an end 80a of the inlet conduit 80 for the homogeneous introduction of the ammonia/air mixture into the waste-heat steam generator 30. As an alternative, an introduction of pressure-fluidized ammonia ($NH_3$) or urea solution can be provided as a preliminary stage of the ammonia ($NH_3$), which is not odor-neutral, in the metering system 68.

The metering system 68 includes two air compressors 84 and 86 for supplying the carrier air TL to the mixing space 78. Air induction conduits 88, 90 are respectively connected upstream of the air compressors 84, 86. The air compressor 84 is connected to an air conduit 92a and the air compressor 86 is connected to an air conduit 92b. The air conduit 92a can be closed by a valve 94 and the air conduit 92b can be closed by a valve 96. The air conduit 92a and the air conduit 92b are combined to form a common air conduit 92, which opens into the mixing space 78.

A non-illustrated switch-over device has the effect of operating only one or simultaneously both of the air compressors 84, 86 as a function of the fuel B supplied to the gas turbine 4.

Therefore, during operation of the gas and steam turbine plant 2, only one or both of the two air compressors 84, 86 are employed as a function of the type of fuel supplied to the gas turbine 4. On one hand, in contrast to gas operation, a higher degree of separation of the oxides of nitrogen ($NO_x$) is generally necessary during oil operation because of the particularly high emission of the oxides of nitrogen from the gas turbine 4. On the other hand, in the case of gas operation of the plant, the quantity of oxides of nitrogen occurring is markedly less. The injection rate of the ammonia solution AW is therefore also dependent on the type of fuel B operating the gas turbine 4. On one hand, in the case of gas operation, only one of the air compressors 84, 86 is correspondingly employed. On the other hand, in the case of oil operation of the gas and steam turbine plant 2, both air compressors 84 and 86 are employed. In this configuration, the air compressors 84 and 86 are constructed in such a way that, during gas operation of the plant, it is sufficient to operate one individual air compressor for the operation of the metering system 68. As an alternative, or additionally, the air compressors 84, 86 can also have a speed-controlled drive, through the use of which the output of the carrier air TL is controlled.

Since the metering system 68 has two air compressors 84 and 86, a particularly high level of flexibility in the supply of carrier air TL for the metering system 68 is possible with a particularly small amount of technical complexity. In this way, a particularly high efficiency is possible for the waste-heat steam generator 30 (which is constructed for an SCR method) of the steam turbine plant 2b, under all operating conditions of the gas and steam turbine plant 2.

We claim:

1. A method of operating a gas and steam turbine plant, which comprises:

providing a gas turbine and a steam turbine;

operating the gas turbine with a fuel to produce an expanded working medium;

generating steam for the steam turbine from heat contained in the expanded working medium leaving the gas turbine;

introducing a reducing agent and a supply of an adjustable quantity of carrier air into the working medium with a metering system, for catalytically cleaning the working medium;

adjusting the quantity of carrier air as a function of a type of the fuel supplied to the gas turbine;

controlling the quantity of carrier air with only a first air compressor for gas fuel operation of the gas turbine; and controlling the quantity of carrier air additionally with a second air compressor, connected in parallel with the first air compressor, for oil fuel operation of the gas turbine.

2. A gas and steam turbine plant, comprising:

a gas turbine to be selectively operated both with gas and with oil as a fuel for producing an expanded working medium;

a waste-heat steam generator disposed downstream of said gas turbine;

a catalytic converter disposed in said steam generator for catalytically cleaning the expanded working medium from said gas turbine; and a metering system having first and second air compressors for introducing a reducing agent into the working medium, said second air compressor connected in parallel with said first air compressor at least during oil fuel operation of said gas turbine.

* * * * *